United States Patent
Zhang et al.

(10) Patent No.: US 12,233,983 B2
(45) Date of Patent: Feb. 25, 2025

(54) RATCHET-DRIVEN SELF-PROPELLED SCOOTER

(71) Applicants: Chen Zhang, Anhui (CN); Jimin Zhang, Anhui (CN)

(72) Inventors: Chen Zhang, Anhui (CN); Jimin Zhang, Anhui (CN)

( * ) Notice: Subject to any disclaimer, the term of this patent is extended or adjusted under 35 U.S.C. 154(b) by 556 days.

(21) Appl. No.: 17/586,788

(22) Filed: Jan. 28, 2022

(65) Prior Publication Data
US 2023/0174187 A1    Jun. 8, 2023

(51) Int. Cl.
*B62K 17/00*    (2006.01)
*A63C 17/12*    (2006.01)
*B62M 1/24*    (2013.01)

(52) U.S. Cl.
CPC ............... *B62K 17/00* (2013.01); *B62M 1/24* (2013.01); *A63C 17/12* (2013.01)

(58) Field of Classification Search
CPC ............ B62M 1/24; B62M 1/32; A63C 17/12
USPC ........................................................ 280/221
See application file for complete search history.

(56) References Cited

U.S. PATENT DOCUMENTS

| | | | | |
|---|---|---|---|---|
| 521,490 | A | * | 6/1894 | Wilkin ...................... F16H 3/00 |
| | | | | 74/134 |
| 1,637,266 | A | * | 7/1927 | Maxson ................... B62M 1/32 |
| | | | | 280/255 |
| 7,793,956 | B2 | * | 9/2010 | Hsu ........................ B62K 3/002 |
| | | | | 280/220 |
| 2019/0329122 | A1 | * | 10/2019 | Lee .......................... B62M 1/30 |

FOREIGN PATENT DOCUMENTS

| | | | | |
|---|---|---|---|---|
| CN | 111717321 A | * | 9/2020 | .............. B62M 1/24 |
| DE | 10312878 A1 | * | 10/2004 | .............. A63C 17/12 |
| KR | 2011006800 U | * | 7/2011 | |

* cited by examiner

*Primary Examiner* — Valentin Neacsu
*Assistant Examiner* — Mohamed Medani

(57) ABSTRACT

The invention discloses a ratchet-driven self-propelled scooter, comprising a scooter body and a transmission mechanism set on the scooter body; the invention provides a manpower self-propelled scooter with simple structure, light weight and low cost; step on a driving pedal to put a driving clamp in motion, thereby a pressing arm wheel drives a ratchet arm, then a ratchet pawl leads an axle to drive the rear traveling wheels to rotate, so that the scooter body moves; after releasing the driving pedal, the driving pedal is reset through a torsion spring, likewise repeatedly stepping to increase the driving force for the scooter body; the device possesses a complete scheme, simple structure, convenient operation, low cost, which is worthy of widespread promotion.

3 Claims, 1 Drawing Sheet

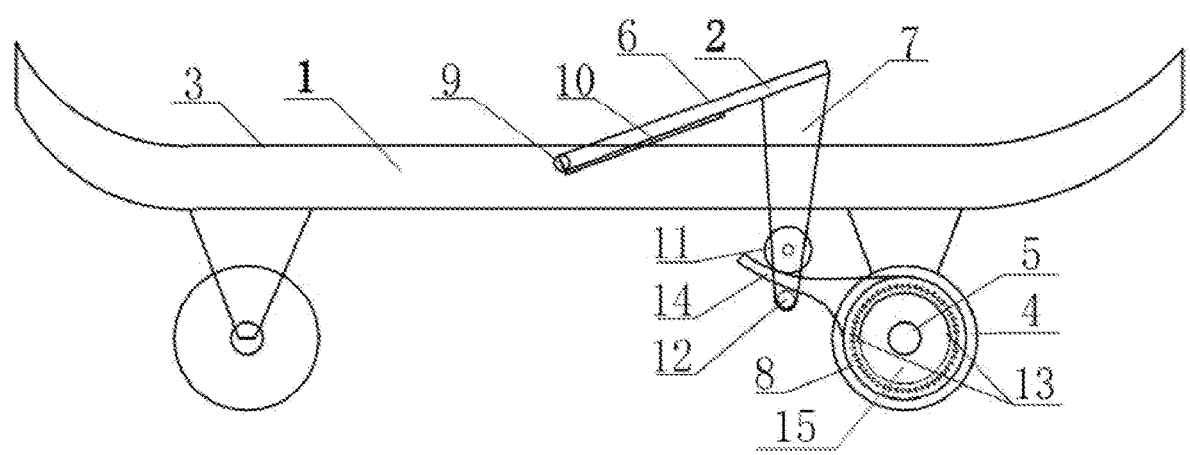

RATCHET-DRIVEN SELF-PROPELLED SCOOTER

BACKGROUND OF THE INVENTION

1. Field of the Invention

The invention relates to the technical field of scooters, in particular to a ratchet-driven self-propelled scooter.

2. Description of Related Art

Existing scooters are divided into two types: electric and self-propelled. Among them, electric scooters are complex and heavy in structure and are expensive to produce; while ordinary self-propelled scooters have no driving device and require people to pedal on the ground to provide propulsion. Therefore, a ratchet-driven self-propelled scooter with excellent performance, simple structure, light weight and low cost is worth recommending.

SUMMARY OF THE INVENTION

The technical problem to be solved by the invention is a ratchet-driven and self-propelled scooter.

To solve the above technical problem, the technical solution of the invention is a ratchet-driven and self-propelled scooter, comprising a scooter body and a transmission mechanism set on the scooter body;

the scooter body comprises a scooter main body, traveling wheels respectively provided at the front and rear ends of the lower side of the scooter main body and the axles matched with the traveling wheels;

the transmission mechanism comprises a driving pedal, a driving clamp and ratchets; the driving pedal is arranged on the scooter main body, the front end is installed on the scooter main body through a supporting shaft, and the rear end is tilted upward with an adjustable angle; a torsion spring is arranged between the driving pedal and the supporting shaft to reset the pedal; the driving clamp is arranged at the lower rear end of the driving pedal, the lower part of the driving clamp is equipped with a pressing arm wheel, and the bottom end is equipped with a lifting arm wheel; the ratchet and the ratchet pawl disc are installed on the axle of the rear traveling wheel in cooperation, and the ratchet pawl disc rotates synchronously with the axle and the rear wheel, and the outer side wall of the ratchet is provided with a ratchet arm; the other end of the ratchet arm extends between the pressing arm wheel and the lifting arm wheel.

Compared with the prior art, the advantages of the invention are: the invention provides a manpower self-propelled scooter with simple structure, light weight and low cost; step on the driving pedal to put the driving clamp in motion, thereby the pressing arm wheel drives the ratchet arm, then the ratchet pawl drives the axle to drive the rear traveling wheels to rotate, so that the scooter body moves; after releasing the driving pedal, the driving pedal is reset through the torsion spring, likewise repeatedly stepping to increase the driving force for the scooter body; the device possesses a complete scheme, simple structure, convenient operation, low cost, which is worthy of widespread promotion.

BRIEF DESCRIPTION OF THE DRAWINGS

FIG. 1 is a structural diagram of a ratchet-driven self-propelled scooter according to the invention.

As shown in the figure: 1 refers to the scooter body; 2 refers to the transmission mechanism; 3 refers to the scooter main body; 4 refers to the traveling wheel; 5 refers to the axle; 6 refers to the driving pedal; 7 refers to the driving clamp; 8 refers to the ratchet; 9 refers to the supporting shaft; 10 refers to the torsion spring; 11 refers to the pressing arm wheel; 12 refers to the lifting arm wheel; 13 refers to the ratchet paw; 14 refers to the ratchet arm; 15 refers to the ratchet pawl disc.

DETAILED DESCRIPTION OF THE PREFERRED EMBODIMENTS

The ratchet-driven self-propelled scooter of the invention is further described in detail with reference to the drawing hereinafter.

with reference to the drawing, a ratchet-driven self-propelled scooter, comprising a scooter body 1 and a transmission mechanism 2 set on the scooter body 1;

the scooter body 1 comprises a scooter main body 3, traveling wheels 4 respectively provided at the front and rear ends of the lower side of the scooter main body 3 and the axles 5 matched with the traveling wheels 4;

the transmission mechanism 2 comprises a driving pedal 6, a driving clamp 7 and ratchets 8; the driving pedal 6 is arranged on the scooter main body 3, the front end is installed on the scooter main body 3 through a supporting shaft 9, and the rear end is tilted upward at an adjustable angle of 10°-45°; a torsion spring is arranged between the driving pedal and the supporting shaft to reset the pedal; the driving clamp is arranged at the lower rear end of the driving pedal, the lower part of the driving clamp is provided with a pressing arm wheel, and the bottom end is provided with a lifting arm wheel; the outer side wall of the ratchet 8 is provided with a ratchet arm 14; the ratchet 8 is provided with gear teeth, and the gear teeth drive the ratchet pawl 13 to drive the ratchet pawl disc 15 to rotate; the other end of the ratchet arm 14 extends between the pressing arm wheel 11 and the lifting arm wheel 12; the ratchet 8 is installed in cooperation with the ratchet pawl disc 15, and the ratchet pawl 13 is installed on the pawl disc 15; the ratchet pawl disc 15 is fixedly installed on the axle 5 and rotates synchronously with the axle 5.

The number of traveling wheels at the front or rear ends can be 1-2.

The specific embodiment of a ratchet-driven self-propelled scooter of the invention is as follows: in application, when the user steps on the driving pedal 6 to rotate it downward through the rotation of the supporting shaft 9, the ratchet arm 14 is pressed down under the cooperation of the driving clamp 7 and the pressing arm wheel 11 to drive the ratchet 8 to rotate, thereby driving the ratchet pawl 13 to rotate synchronously with the axle 5, which provides power to the rear traveling wheel 4 to make the scooter body 1 move forward; after releasing the pedal 6, it is reset by the torsion spring 10, and the ratchet arm 14 is reset upward under the cooperation of the driving clamp 7 and the lifting arm wheel 12. The user can increase the driving force provided to the scooter body 1 by repeatedly pedaling, thereby increasing the speed of the scooter body 1.

At the same time, the front part of the scooter body 3 can be provided with a handrail, and the rear part is provided with a brake device matched with the traveling wheel 4 to adapt to the safe use of children and ensure their safety.

In the description of the invention, examples of the embodiment are shown in the drawings, in which the same or similar reference numerals indicate the same or similar elements or elements with the same or similar functions throughout. In the embodiment, it needs to be understood that the terms "upper", "lower", "front", "rear", "left", "right", "inner", "outer", "vertical", "circumferential", etc. that indicate the orientation or positional relationship are based on the orientation or positional relationship shown in the drawings, and is only for the convenience of describing and simplifying the description, rather than indicating or implying that the pointed device or element must have a specific orientation, or be constructed and operated in a specific orientation, therefore cannot be understood as a limitation of the invention.

In the invention, unless otherwise clearly defined and limited, the terms "provide", "connect", "through", "install" and other terms should be interpreted broadly; for example, it can be a fixed connection, it can be a detachable connection, or integrated; it can be a mechanical connection or an electrical connection; it can be a direct connection, or an indirect connection through an intermediate medium, and it can be an internal communication between two elements or the interaction relationship between two elements. For those of ordinary skill in the art, the specific meaning of the above terms in the invention can be understood according to specific circumstances.

In the description of the specification, the reference terms "one embodiment", "some embodiments", "examples", "specific example" or "some examples" etc. means that the specific feature, structure, material or feature described in combination with the embodiment or example is included in at least one embodiment or example of the invention. In this specification, the schematic representations of the above terms do not necessarily refer to the same embodiment or example. Moreover, the described specific features, structures, materials or features can be combined in any one or more embodiments or examples in a suitable manner.

The invention and its embodiment are described above. This description is not restrictive. What is shown in the drawings is only one of the embodiments of the invention, and the actual structure is not limited to this. All in all, if a person of ordinary skill in the art receives its enlightenment and does not deviate from the purpose of the invention, their designed structural methods and embodiments that are similar to the technical solution without any creativity shall fall within the protection scope of the invention.

The invention claimed is:

1. A ratchet-driven self-propelled scooter, comprising a scooter body and a transmission mechanism set on the scooter body;
   the scooter body comprises a scooter main body, traveling wheels respectively provided at front and rear ends of the a lower side of the scooter main body and axles matched with the traveling wheels, and a ratchet pawl disc is provided on the axles;
   the transmission mechanism comprises a driving pedal, a driving clamp and a ratchets; the driving pedal is arranged on the scooter main body, front end of the driving pedal is installed on the scooter main body through a supporting shaft, and rear end of the driving pedal is tilted; a torsion spring is arranged between the driving pedal and the supporting shaft; the driving clamp is arranged at a lower rear end of the driving pedal, a lower part of the driving clamp is provided with a pressing arm wheel, and a bottom end of the driving clamp is provided with a lifting arm wheel; the ratchet and the ratchet pawl disc are installed on the axle of the rear traveling wheel in cooperation, and the ratchet pawl disc rotates synchronously with the axle and the rear wheel, and an outer side wall of the ratchet is provided with a ratchet arm; one end of the ratchet arm extends between the pressing arm wheel and the lifting arm wheel.

2. The ratchet-driven self-propelled scooter according to claim 1, wherein the traveling wheels comprise two traveling wheels that are symmetrically provided at the front end and the rear end.

3. The ratchet-driven self-propelled scooter according to claim 1, wherein tilting angle of the driving pedal is 10°-45°.

\* \* \* \* \*